(12) United States Patent
Rein (10) Patent No.: US 6,333,734 B1
(45) Date of Patent: Dec. 25, 2001

(54) METHOD AND DEVICE FOR THE ONE-HANDED INPUT OF DATA

(76) Inventor: Wolf Heider Rein, Carl-Goerdeler-Str. 5, Pforzheim (DE), D-75180

( * ) Notice: Subject to any disclaimer, the term of this patent is extended or adjusted under 35 U.S.C. 154(b) by 0 days.

(21) Appl. No.: 09/242,681

(22) PCT Filed: Aug. 21, 1997

(86) PCT No.: PCT/DE97/01808

§ 371 Date: May 7, 1999

§ 102(e) Date: May 7, 1999

(87) PCT Pub. No.: WO98/08186

PCT Pub. Date: Feb. 26, 1998

(30) Foreign Application Priority Data

Aug. 23, 1996 (DE) .............................................. 196 34 228

(51) Int. Cl.[7] .................................................. G09G 5/00
(52) U.S. Cl. ...................... 345/169; 345/168; 345/160; 345/156; 345/157; 345/163; 341/22; 341/23
(58) Field of Search ..................... 345/163, 161, 345/168, 123, 124, 125, 160, 169, 156, 157; 341/22, 23

(56) References Cited

U.S. PATENT DOCUMENTS

| 4,580,006 | 4/1986 | Daniel . |
| 4,913,573 | 4/1990 | Retter . |
| 4,917,516 | 4/1990 | Retter . |
| 5,058,840 | 10/1991 | Moss . |
| 5,063,376 | * 11/1991 | Chang ................................... 345/163 |
| 5,657,051 | * 8/1997 | Liao ...................................... 345/163 |
| 5,790,102 | * 8/1998 | Nassimi ................................ 345/163 |
| 5,798,755 | * 8/1998 | Holgate ................................ 345/163 |
| 5,847,695 | * 12/1998 | Duncan et al. ....................... 345/163 |
| 6,091,401 | * 7/2000 | Chen et al. ........................... 345/163 |
| 6,115,028 | * 12/2000 | Balakrishnan et al. .............. 345/157 |
| 6,166,721 | * 12/2000 | Kuroiwa et al. ..................... 345/163 |

FOREIGN PATENT DOCUMENTS

| 0 427 036 | 5/1991 | (EP) . |
| 2 654 233 | 5/1991 | (FR) . |
| 2 071 578 | 9/1981 | (GB) . |
| 2 122 787 | 1/1984 | (GB) . |
| 2 131 746 | 6/1984 | (GB) . |
| WO 93 21604 | 10/1993 | (WO) . |

* cited by examiner

*Primary Examiner*—Richard Hjerpe
*Assistant Examiner*—Ali Zamani
(74) *Attorney, Agent, or Firm*—Paul Vincent

(57) ABSTRACT

The invention concerns a device for the one-handed input of coordinates of multi-axis coordinate systems and alphanumeric characters and control commands, the device being operable with one hand. The forearm does not participate in the movements and rests on a support. The device comprises a plurality of elongated keys having sensor surfaces which, when depressed, detect and evaluate the position of a fingertip as a coordinate. The device comprises a housing which detects and evaluates the ulnar pivot movement of the hand as a horizontal coordinate and the pronation of the hand and a translation in the direction of the arm as control signals. The device combines the input functions of a mouse and a keyboard.

14 Claims, 6 Drawing Sheets

Hand pivoted to the left

Hand in its Base Position

Hand pivoted to the right

Fig. 6

Hand pivoted to the left

Hand in its Base Position

Hand pivoted to the right

METHOD AND DEVICE FOR THE ONE-HANDED INPUT OF DATA

BACKGROUND OF THE INVENTION

The invention concerns an input device for the manual input of information at a monitor screen working station for single handed input of data, namely of coordinates in a multi-axis coordinate system, and of alphanumerical symbols and control commands, with an intrinsically stationary lower member (base plate) which can be disposed on a support surface, with a housing disposed above the lower member which can be moved relative to the lower member transverse to the direction of the forearm of the user, wherein this motion is input as data, with keys for the input of data and with a device above the lower member to convert the input motions given via the keys and the housing into electrical signal sequences of corresponding data interfaces and an input method for single hand input of data using an input device comprising choosing differing keyboard assignments for the input of coordinates, alphanumeric symbols and control commands, and detecting the keyboard assignments.

A conventional input device and a conventional input method of the kind characterizing the invention have keys which can be differently assigned according to choice for the input of coordinates, alphanumeric symbols or control commands. The multiple assignments are effected through the detection of a motion transverse to the direction of the forearm of the user, wherein the respective positions of the finger tip on the keys of the input device as well as the operation of the keys are detected by a device for conversion of the given input movements into an electrical signal sequence of corresponding data and interfaces. Although these types of conventional systems occupy a substantially less amount of space at the working surface directly in front of the operating individual then other normally used devices having a computer mouse and a keyboard, they nevertheless do not fulfill all possible flexibility with respect to the input of data such as e.g. a plurality of pointing functions namely cursors, scrolls and menus.

SUMMARY OF THE INVENTION

The input device in accordance with the invention wherein the transverse motion of the housing above the lower member is a pivoting motion about the axis perpendicular to the support surface of the input device and extending through the wrist of the user and at least one key is elongated in shape and has a transmitting member which detects the longitudinal position of the fingertip on the key, with high resolution, as a coordinate the method in accordance with the invention comprising detecting the position of the fingertip on elongated keys relative to the longitudinal extent of the key, wherein the longitudinal extent is in the longitudinal direction of the forearm of the user, detecting the pivot motion at the input device as an ulnar abduction via the pivot angle, rotating or tilting the input device as a pronation via the tilt angle or rotation angle, and displacing the input device and detecting the translation via the displacement path have, in contrast thereto, the advantage that the pivot motion in accordance with the invention is combined with a rotational motion and the use of at least one elongated key which is substantially more economical than in conventional input devices and methods. In addition, a substantially greater amount of differing data can be input and detected.

In accordance with an advantageous configuration of the invention, the housing can be longitudinally displaced on the support portion in the direction of the forearm of the user. This longitudinal motion is not only economical rather also ergonomical.

In accordance with an additional advantageous configuration of the invention, the input device detects, with high resolution, the ulnar pivot motion of the hand as a coordinate so that a sideward motion of the input device can be carried out with the forearm at rest.

In accordance with an additional advantageous configuration of the invention, the housing of the input device is borne for pivoting relative to the underlying surface about an axis extending in the direction of the forearm and in an additional configuration of the invention the pronation is detected via the pivot angle of the housing so that the hand can rest with its weight on the keyboard without having any function being triggered. Function is first triggered by rotation of the housing.

In accordance with an additional advantageous configuration of the invention, the transformation of the input motion is effected with a resolution dependent on the mode of operation so for certain modes, the input can be effected "blindly".

In accordance with an additional advantageous configuration of the invention, the resolution of the conversion of the input signals is adjusted to the amplitudes of the individual fine motor motion of the hand so that operation can be adapted to normal individual movements.

In accordance with an additional advantageous configuration of the invention, conversion of the input signals produces the coordinates from the pointing device and code signals from the keys in such a manner that the input device has a plug compatible with conventional keyboards and computer mouse devices.

In accordance with additional advantageous configuration of the invention, the input device is symmetric and the keyboard arrangement can be adjusted to operation with the right or with the left hand so that only one single device is required for right and left-handed individuals. Software controls switching between right-handed and left-handed operation.

In accordance with an additional advantageous configuration of the invention, touch feedback is associated with motion of the keys or motion of the housing in dependence on the current mode of operation and current key arrangement so that the instantaneous keyboard arrangement can be felt as can the mode of operation.

In accordance with an advantageous configuration of the input method in accordance with the invention, the sampling points of the finger or fingers and the positions of the input device are converted into corresponding signal sequences having changing patterns to simplify operation.

In accordance with an additional advantageous configuration of the input method, sense of touch feedback is associated with the motion of the input device in dependence on the instantaneous mode of operation and the instantaneous key assignments so that the input can also be carried out "blindly". It is thereby equally suitable for blind individuals as well as for individuals with normal vision. In addition, the input speed can thereby be increased.

In accordance with an additional advantageous configuration of the input method, the keyboard assignments can be adjusted to input from the right or the left hand so that one can even change the input hand during operation and right or left handed people can use the method and the device in accordance with the invention with equal ease.

Additional advantages and advantageous configurations of the invention can be extracted from the subsequent description, the drawings and the claims.

BRIEF DESCRIPTION OF THE DRAWING

An embodiment of the object of the invention is shown in the drawings and described more closely below.

DESCRIPTION OF THE PREFERRED EMBODIMENT

Figure 1:
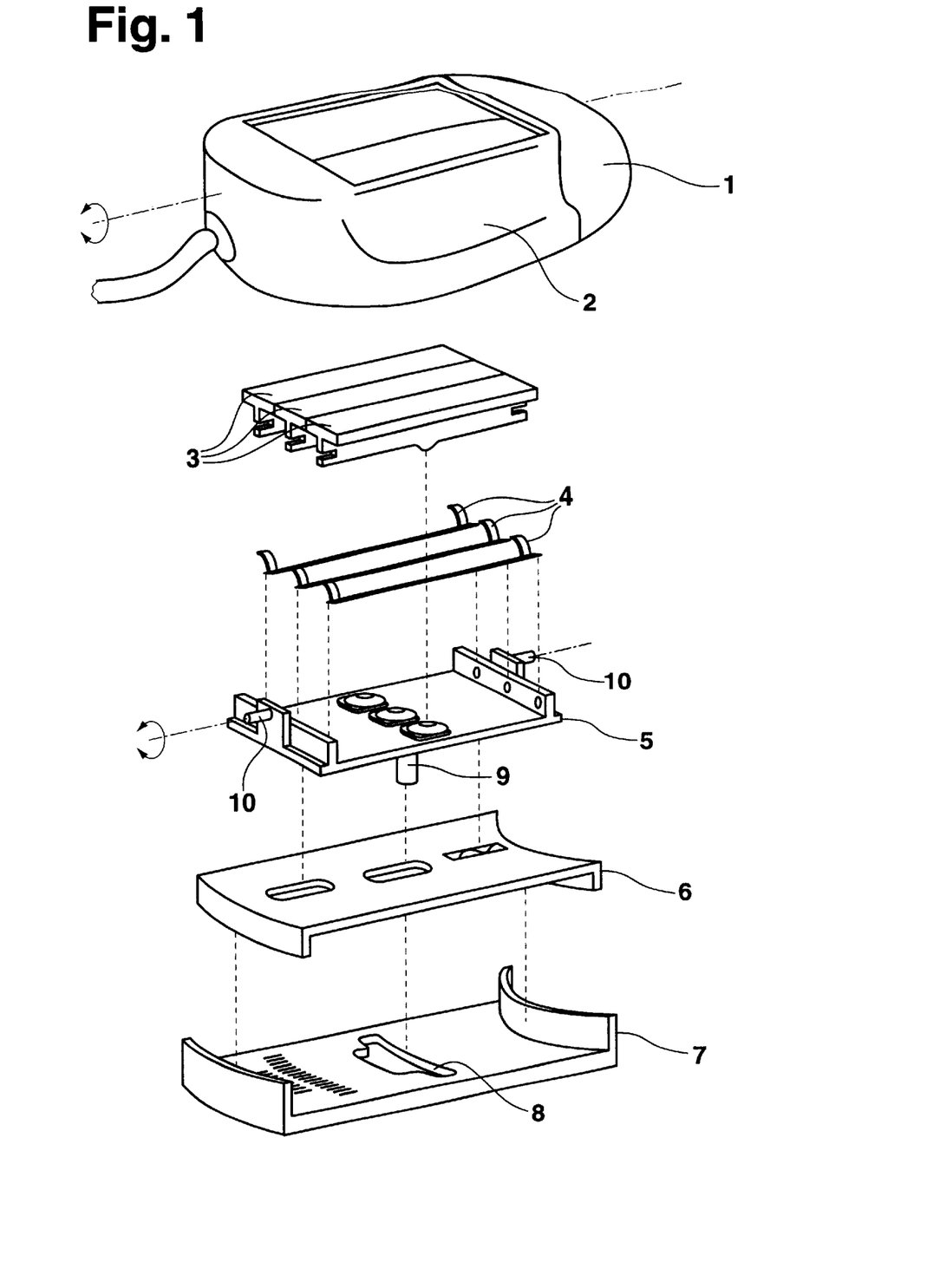
FIG. 1 shows the principal mechanical components of the device.

FIG. 1 shows an exploded view of the input device. The device has a housing 1 with a seating surface 2 for the thumb and for the small finger. The housing 1 has an opening for three long keys 3 which are connected by means of a parallel guide 4 to the housing support 5. The housing 1 is borne for pivoting in its symmetry plane on an axle 10 of the housing support 5. The housing support 5 can be displaced parallel to the axle 10 on the pivot plate 6 between two latching positions. The pivot plate 6 is borne for rotation on the base plate 7. The pivot axis thereby extends outside the housing perpendicular to the base plate and through the user's wrist. A pin 9 of the housing support 5 engages through the pivot plate 6 and into an opening 8 in the base plate 7 to limit the pivot angle. As can be seen in the drawing the free pivot angle of the housing support 5 is larger in the right latching position than in the left latching position.

Figure 2:
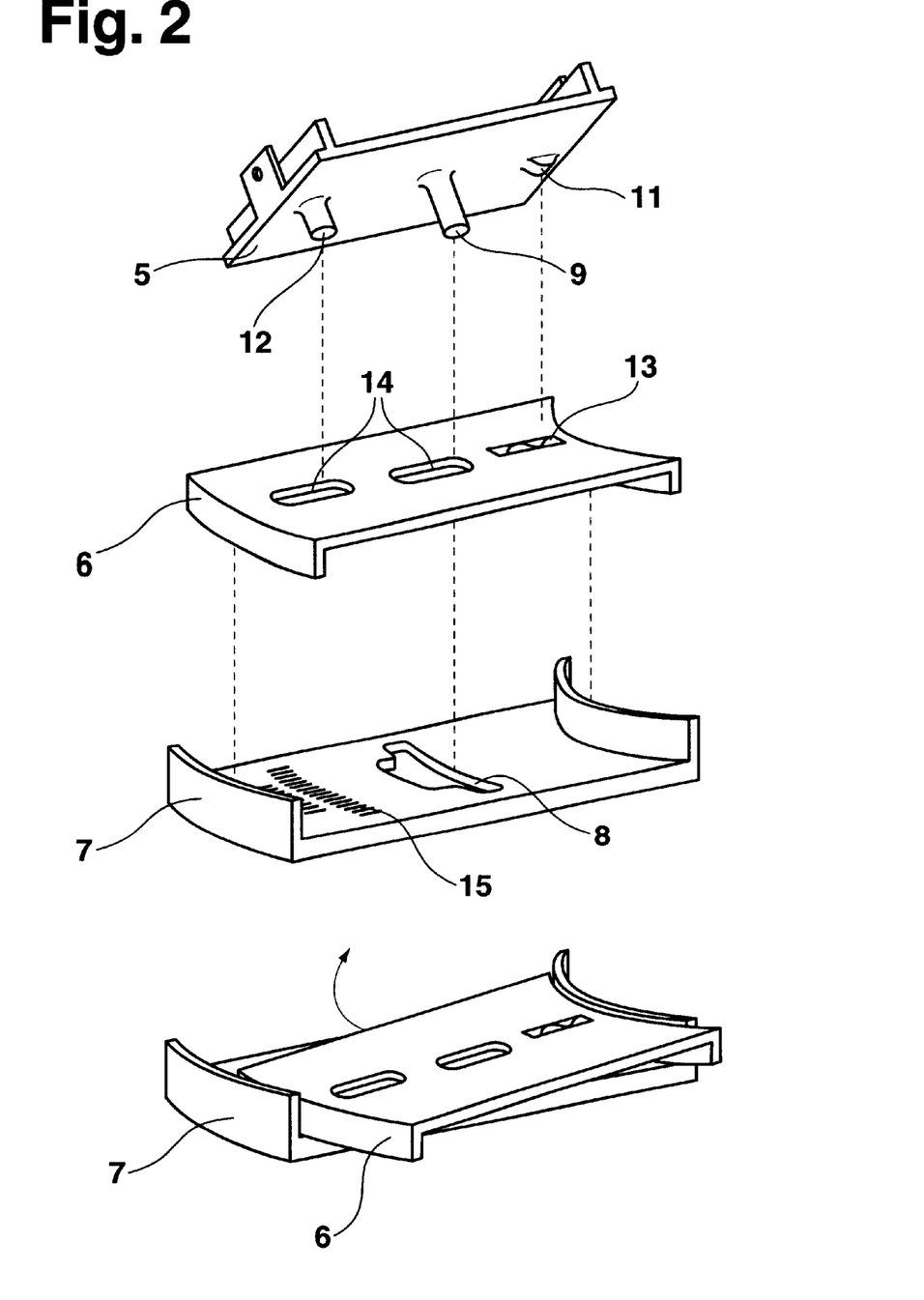
FIG. 2 shows the types of motion of the pivot plate and the housing support.

FIG. 2 shows an exploded view of the lower side of the housing support 5. One sees the parallel guide via the two pins 9 and 12 in the two slots 14. In addition, one sees the protrusion 11 on the housing support 5 which engages into one of the two recesses 13 in the pivot plate 6. In this manner, in cooperation with a spring (not shown), two stable latching potions can be effected between which one can push forward and pull back the housing support. The pin 12 on the housing support 5 has an optical system which scans a line rule 15 on the base plate 5 and converts same into an angular quantity. One also sees that two differing line rules can be active in the two latching positions. Sense of touch feedback for the motion of the housing is given by position dependent restoring forces which pull the housing into its base position. A particular advantage of the method is the longitudinal motion of the device when switching the mode of operation. The seating of the device can effect sense of touch feedback from various motions of the housing, so that one can feel which mode of operation is currently in use.

Figure 3:
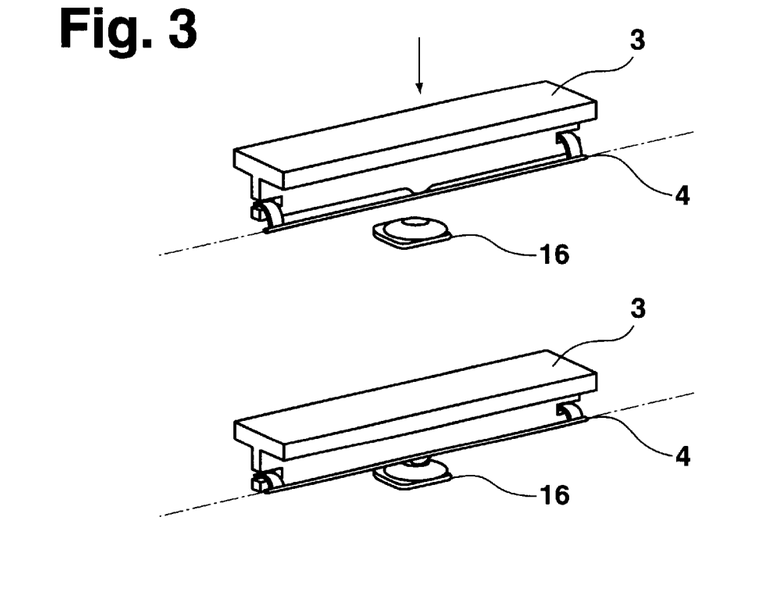
FIG. 3 shows a parallel guide for the up and down motion of the long keys.

FIG. 3 shows a parallel guide for a long key 3. A shaft, stiff with respect to rotation and borne in the housing support, engages with two levers into the slots on both ends of the key 3. In this manner, one operates the pressure contact 16 independent of the position at which the key is pressed. In addition, the key 3 has a curved surface. In this manner, the user feels the position of the key 3 at which his finger is located.

Figure 4:
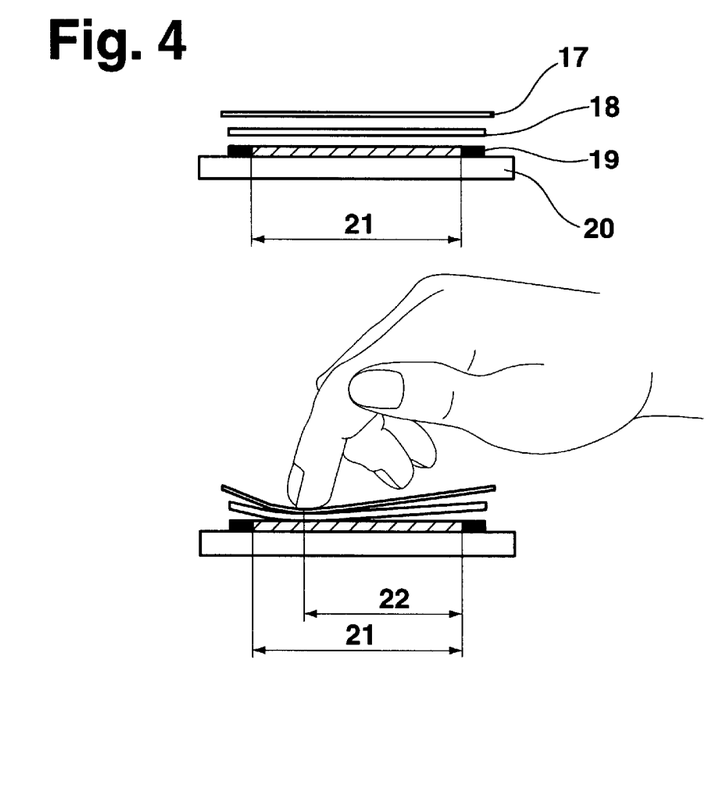
FIG. 4 shows a configuration for detecting the finger-tip positions on the long keys.

FIG. 4 shows a configuration with which the position of the fingertip on a long key can be detected. A strip 19 made from a resistant material (a painted coating or foil) and having a length 21 seats on the non-conducting key body 20 of the key 3 and can be connected at both ends to an electrical voltage. A contact foil 18 seats on this strip and is made from a pressure sensitive material whose conductivity is very low in the pressure-less state and increases substantially under mechanical pressure. A slide foil 17 seats over the contact foil 18 and has a metallic lower side. When a finger presses onto this configuration, the metallic lower side is connected in a conducting fashion via the contact foil 18 at one location to the resistive strip 19. The voltage potential transferred to the lower metallic side is a measure 22 of the pressure location.

Figure 5:
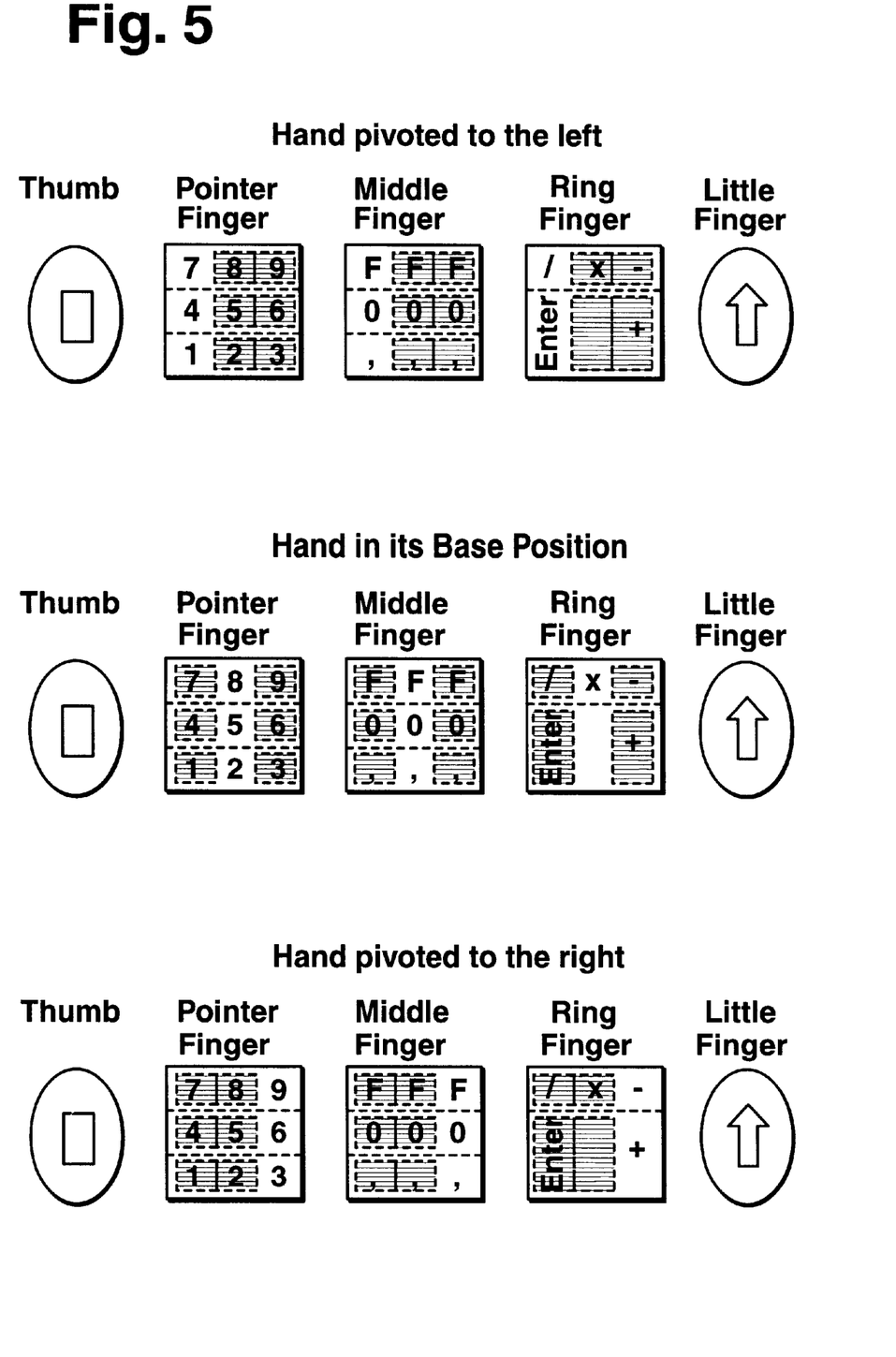
FIG. 5 shows a keyboard map for the number shift.

FIG. 5 shows a key mapping for the numeral shift with which the numerals 1 to 9 can be input with the pointer finger. In order to input an "8", one pivots the hand into its base position, extends the pointer finger and operates the pointer finger key at its upper end. In order to input a "2", one remains in the base position with the hand and bends the pointer finger to operate the pointer finger key at its lower end. A "5" is likewise input with the hand at this base position, wherein one operates the pointer finger key in the middle position. The same motion of the pointer finger can be used to input the numerals "7", "4", and "1", when the hand is previously pivoted towards the left. When the hand is previously pivoted towards the right, the same position of the pointer finger can be used to input the numerals "9", "6", and "3". With the key mapping shown in FIG. 5, operation of the middle finger has the same function in all three hand positions. In order to input a "0", one operates the middle finger key in the middle. In order to input a decimal comma one operates the middle finger key at its lower end. The key mapping indicates an "F" on the upper end of the middle finger key with which the number functions "F1", "F2", "F3" and the like can be effected. In order to avoid unintentional improper operation one can provide a particular motional dependence for the number functions which deviates from the normal dependence during input of numerals. This can be done e.g. by means of double keying: while pushing the middle finger key on the upper end, one actuates the function key number with the pointer finger. An indication is thereby given on the screen concerning the function chosen. Operation of the thumb, which tilts the housing towards one side, starts the chosen function.

The thumb and the small finger can tilt the housing out of its normal horizontal position towards the left or the right and preferentially have the same mapping at all hand positions (left-middle-right). The thumb produces e.g. a word separation (space) or starts a function (enter) and the small finger effects e.g. a shift change to thereby shift, with a double click, between the number shift and the letter shift.

Figure 6:
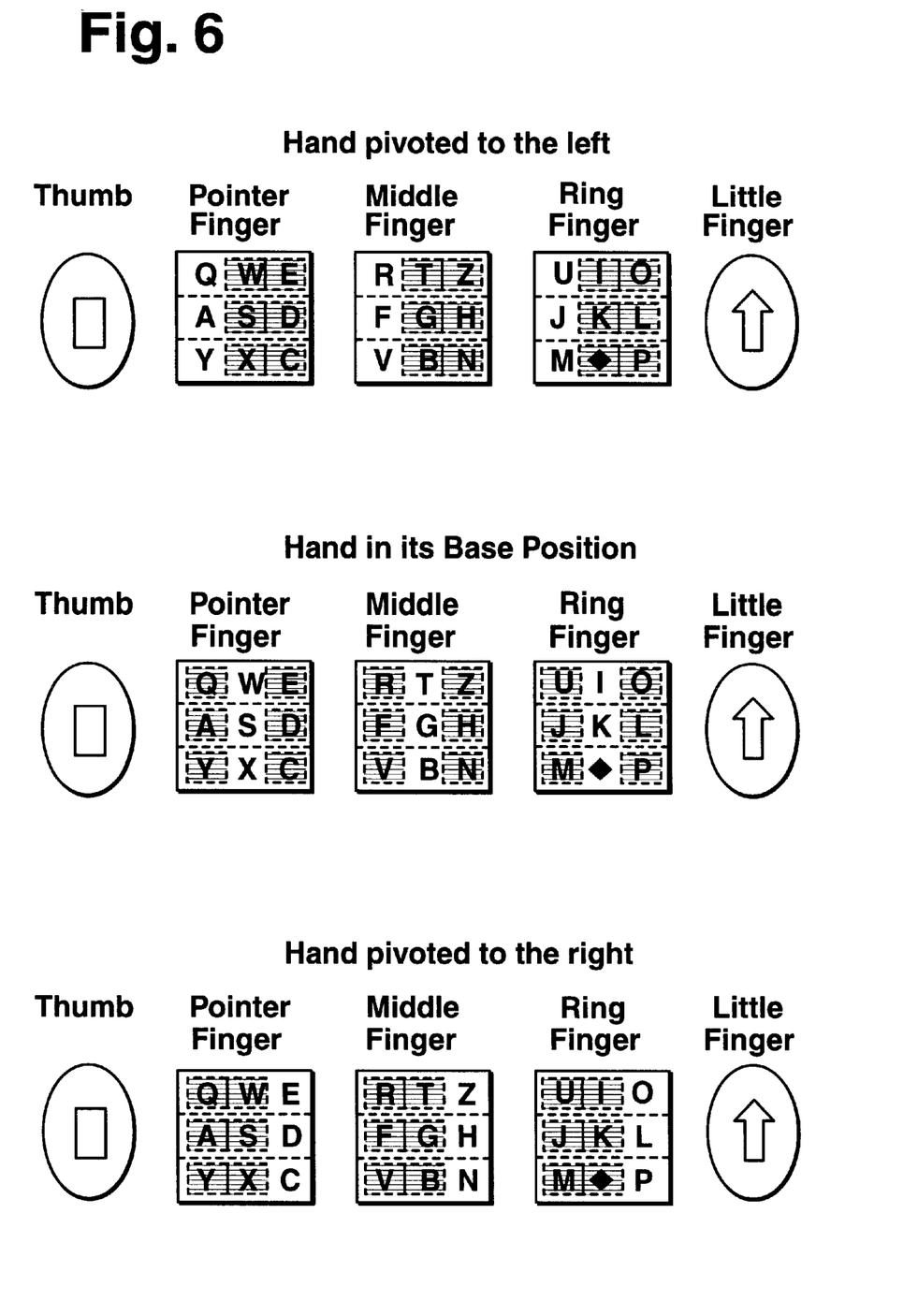
FIG. 6 shows a keyboard map for the letter shift.

FIG. 6 shows a keyboard map for the letter shift. Each of the three operating fingers (pointer finger, middle finger, ring finger) can operate its key at three locations (upper, middle, lower). The mapping of these 3×3=9 sampling points also depends on the hand position (pivoted to the left, base position, pivoted to the right). With the three hand positions one can thereby effect 3×9=27 different key points which is sufficient for the latin alphabet.

One can also program the keyboard mapping to have more or less sampling points. Should a key have four different sequential sampling points and should the hand have five different angular tilt, there are 3×4×5=60 differing key points. This mapping could be usefull for languages having large alphabets.

FIG. 6 shows a keyboard mapping which is conventional for German language keyboards. This keyboard mapping is not advantageous for the new input method. It is ergonomically better to configure the letters in such a fashion that the most frequently used letters are input by the pointer finger and the middle finger in the base position of the hand. It is also advantageous for letters which normally follow each other such as "e-n" or "n-e" or "e-s" or "s-e" and the like to be configured above each other on one key so that this sequence can be input with ergonomically advantageous sliding movement.

Figure 7:
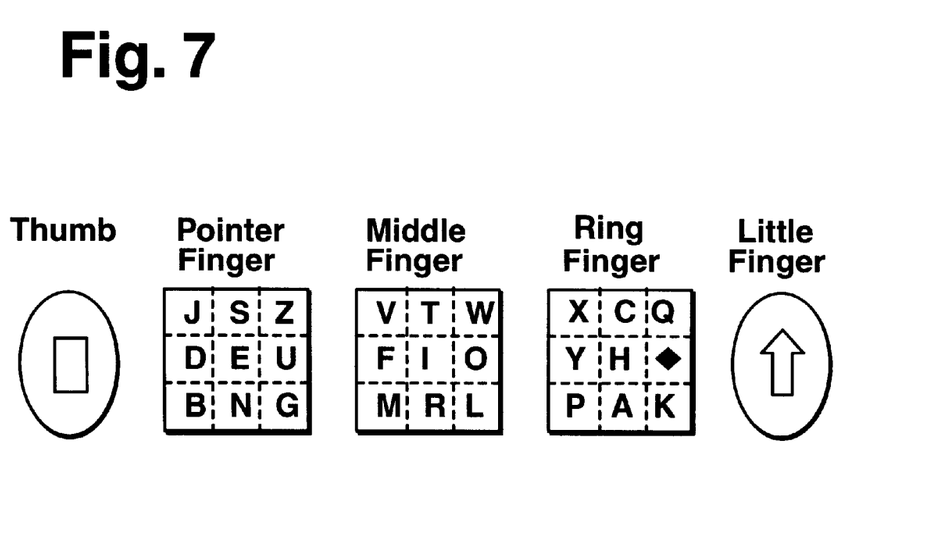
FIG. 7 shows an optimized keyboard mapping for the letter shift.
Figure 8:
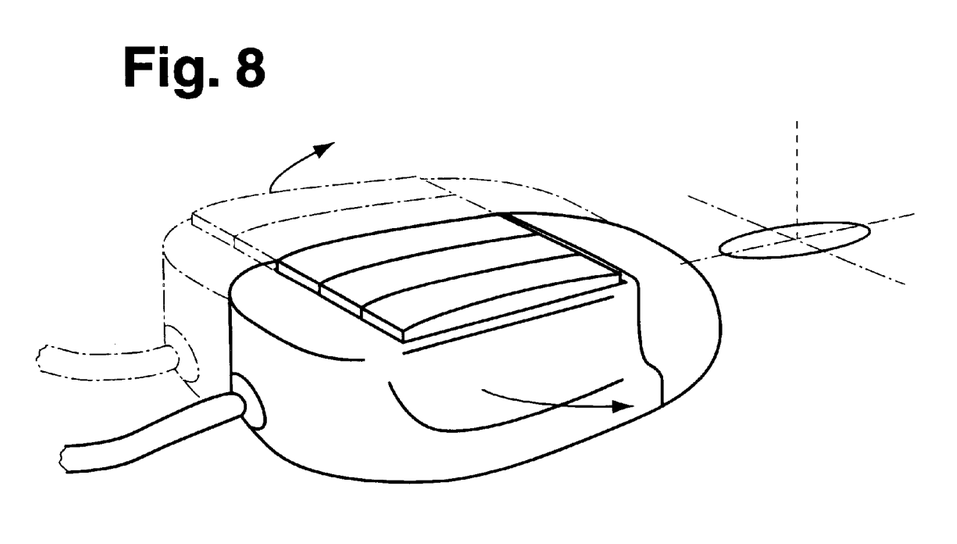
FIG. 8 shows an overall perspective view of the input device in accordance with the invention.

FIG. 7 shows a keyboard mapping which is optimized for input of German texts. It has the following statistics for the input motion:

⅔ of the symbols are input in the base position of the hand,

⅙ of the symbols with the pivot position towards the left,

⅙ of the symbols with the pivot position towards the right,

½ of the symbols with the pointer finger,

⅓ of the symbols with the middle finger,

⅙ of the symbols with the ring finger, and

¼ of the symbol sequences allow for sliding motion.

Table 1 shows a list of abbreviations for special symbols such as "β", "$", "%" and the like, diacritical symbols such as "á", "â", "ä" and the like, punctuation such as "!", "?", ";" and the like, and control commands such as "ENTER", "STRG", "ALT", and the like. In order to write with professional speed, one must be able to input the letters without having to look on the keyboard map. The position of the 26 letters on a keyboard map can be memorized relatively quickly. This is more difficult with the more than 100 remaining symbols, since many of these symbols are used infrequently or practically never. For these reasons, these symbols are shown on the screen and can be selected with a cursor and clicked on in order to be introduced into the text. This input method is cumbersome and slow. With the new input method, a different input procedure is envisioned for non-alphabetical symbols. Most of these symbols have their own names. For example, the symbol (%) has its own name "percent". If one inputs the individual names using a code and ends with a space, the program can automatically convert the individual names into the corresponding symbol. The individual name can thereby be abbreviated. It is thereby important that the abbreviation for the symbol be easily memorized. This is done in the German language using three simple abbreviation rules:

Should the individual name comprise a word, one forms the abbreviation from the beginning letter and the end letter e.g. "percent" is abbreviated "pt".

Should the individual name comprise two or more words, one forms the abbreviation from the beginning letters of these words e.g. "open curved bracket" has the abbreviation "ocb".

Several frequently used symbols can be abbreviated with only one letter instead of two or more letters. This letter is the beginning letter of the individual name. For example, one can abbreviate "period" with "p", "comma" with "c" "question mark" with "q".

With the input procedure in accordance with the invention the following six types of finger and hand motions can be detected as motion relative to the base plate.

The Ulnar Pivot Motion of the Hand

The axis of rotation of this pivot motion is perpendicular to the seating surface and extends through the wrist. The ulnar pivot angle is detected as a horizontal coordinate. The resolution of this coordinate corresponds to the fine motor capability of the hand and can differentiate e.g. 240 angular steps within a pivot range of 12° to the left and 12° towards the right.

The Longitudinal Directed Motion of the Fingertips

By means of bending and stretching of a finger, the finger tip can sweep along a sliding surface of a region in the longitudinal direction of the finger. The spatial location of the finger tip on this sliding surface is detected as a vertical coordinate. The resolution of this coordinate corresponds to the fine motor capability of the finger joint and can differentiate e.g. 160 steps along a sliding surface of 80 millimeters in length. For this type of input, the three particularly mobile fingers are preferentially used: the pointer, the middle finger and the ring finger.

The Depression and Release of the Fingertips

Each sliding surface for the detection of the finger position can be pressed and released independently of the neighboring sliding surfaces. The pressing characterizes the active position signal of a fingertip. When a key is depressed, the position of the fingertip is sequentially detected and evaluated. Release characterizes the neutral non-informative state with which a finger passively seats on its sliding surface. When a key is released and the finger seats without pressure on the sliding surface, the position of the finger tip is irrelevant. The sliding surfaces of the long keys facilitate a motional dependence during input which is not possible with conventional individual keys. In order to sequentially operate two conventional individual keys located above each other one must depress the one key with the finger then lift it up again in order to move to the other key and subsequent thereto, depress the other key. If one will sequentially operate two key points lying above each other on a long key, it is only necessary to depress the fingertip onto the one key point and to then slide the tip of the finger from the depressed key to the other key point. This motional dependence is simpler.

The Tilting Position of the Hand (Pronation)

Seating surfaces are available on the input device for the thumb and the small finger which can be rotated about an axis in the longitudinal direction of the forearm. The rotation angle of this seating surface should preferentially be only several degrees and preferentially differentiates only three angular positions:

a) a control signal 1, with which the seating surface for the thumb is depressed, wherein the seating surface for the small finger is raised, b) a control signal 2, with which the seating surface for the small finger is depressed, wherein the seating surface for the thumb is raised and c) the horizontal base position.

The rotation about a rotation axis located in the middle between the seating surfaces effects balancing of weight. The relatively large weight of the hand can thereby be evenly distributed and rest on both seating surfaces without the weight unintentionally depressing one seating surface to thereby trigger an undesired function.

The Longitudinal Motion of the Hand

When the forearm rests, the hand can be pushed in the forward direction by several millimeters towards the tips of the fingers or be pulled back towards the wrist. In this of direction of motion, the device preferentially has two stable latching positions to switch between two modes of operation. One latching position activates the pointer finger (mouse operation) and the other latching location activates input of alphanumeric symbols (keyboard operation).

Thumb Key

The input method can utilize additional keys which are adapted to the particular mobility of the thumb. The thumb can e.g. operate one or more keys whose key surfaces are perpendicular to its seating surface.

The input method in accordance with the invention can be used not only for screen monitor stations, but also to control or drive other applications e.g. as auxiliary means for disabled persons, robots, simulators, remote controls for toys, computer games etc.

All the features of the input method given in the description, the drawings, and in the claims can be important to the invention in differing contexts, individually or in arbitrary combination.

I claim:

1. A device for single handed input of data as coordinates in a multi-axis coordinate system and as alphanumeric symbols and control commands, comprising:

a stationary lower member for disposal upon a support surface;

a housing mounted above said stationary lower member for transverse pivoting, relative to said lower member, about an axis perpendicular to the support surface extending through a wrist of a user;

an elongated key disposed in an upper part of said housing for data input, said key having a transmitter member for detecting a longitudinal coordinate position of a fingertip of the user on said key, and a converting device disposed within said housing between said elongated key and said stationary lower member to detect and convert said transverse pivoting of said housing and said longitudinal coordinate position of said key into electrical signals as data interface input, wherein conversion of said input motion is effected with a resolution which depends on a mode of operation.

2. The device of claim 1, wherein said housing for longitudinal displacement on said lower member in a direction of a forearm of the user, wherein this longitudinal displacement is converted into electrical signals by said converting device.

3. The device of claim 1, wherein an ulnar pivot motion of a hand is converted into electrical signals by said converting device.

4. The device of claim 1, wherein a pronation is detected by means of at least one of an angle of rotation or a tip angle of said housing.

5. The device of claim 1, wherein said resolution depends on individual fine motor motion amplitudes of a hand.

6. The device of claim 1, wherein conversion of said input motion produces coordinate signals for pointing devices and code signals for a keyboard.

7. The device of claim 1, wherein said housing is symmetric in construction and a keyboard mapping can be adjusted for operation with one of a right and a left hand.

8. The device of claim 1, wherein sense of touch feedback is effected during at least one of motion of said key and motion of said housing in dependence on an instantaneous mode of operation and an instantaneous key mapping.

9. The device of claim 7, wherein said key and said converting device for right-handed operation.

10. The device of claim 7, wherein said key and said converting device for left-handed operation.

11. A method for single hand input of data using an input device comprising the following steps which can also be carried out in differing sequence:

a) choosing differing keyboard assignments for input of coordinates, alphanumeric symbols and control commands;

b) detecting said keyboard assignments;

c) detecting a position of a fingertip on an elongated key relative to a longitudinal extent of said key, wherein said longitudinal extent is in a longitudinal direction of a forearm of a user;

d) detecting a pivot motion at the input device as an ulnar abduction via a pivot angle;

e) at least one of rotating and tilting the input device as a pronation via at least one of a tilt angle and a rotation angle; and f) detecting said pronation of step e), wherein conversion of input motion is effected with a resolution which depends on a mode of operation.

12. The method of claim 11, wherein a conversion of sampling points of the fingertip and of positions of the input device into corresponding signal sequences is effected with changeable patterns.

13. The method of claim 11, wherein motion of the input device effects sense of touch feedback in dependence on an instantaneous mode of operation and an instantaneous keyboard mapping.

14. The method of claim 11, wherein a keyboard napping for input with one of a right and left hand.

* * * * *